United States Patent
Meadows et al.

(10) Patent No.: US 11,625,739 B2
(45) Date of Patent: Apr. 11, 2023

(54) SYSTEMS AND METHODS FOR BULK COMPONENT ANALYSIS

(71) Applicant: aPriori, Inc., Concord, MA (US)

(72) Inventors: Paul Meadows, Farnham (GB); Amanda M. Bligh, Boston, MA (US); Karen B. Gold, Arlington, MA (US); Barton Christopher Phinney, Groton, MA (US)

(73) Assignee: APRIORI TECHNOLOGIES, INC, Concord, MA (US)

( * ) Notice: Subject to any disclaimer, the term of this patent is extended or adjusted under 35 U.S.C. 154(b) by 0 days.

(21) Appl. No.: 16/879,217

(22) Filed: May 20, 2020

(65) Prior Publication Data

US 2020/0372530 A1 Nov. 26, 2020

Related U.S. Application Data

(60) Provisional application No. 62/850,083, filed on May 20, 2019.

(51) Int. Cl.
*G06Q 30/02* (2023.01)
*G06Q 30/06* (2023.01)
*G06Q 30/0201* (2023.01)
*G06Q 30/0601* (2023.01)

(52) U.S. Cl.
CPC ..... *G06Q 30/0206* (2013.01); *G06Q 30/0635* (2013.01)

(58) Field of Classification Search
CPC ................ G06Q 30/0206; G06Q 30/0635
USPC ......................................... 705/400
See application file for complete search history.

(56) References Cited

U.S. PATENT DOCUMENTS

| | | | | |
|---|---|---|---|---|
| 5,481,473 A | * | 1/1996 | Kim | G06F 30/398 716/111 |
| 8,386,296 B2 | | 2/2013 | Hage et al. | |
| 2002/0035525 A1 | | 3/2002 | Yokota et al. | |
| 2003/0172008 A1 | * | 9/2003 | Hage | G06Q 30/02 705/28 |
| 2011/0144786 A1 | * | 6/2011 | Pearce | G06F 30/00 700/100 |
| 2012/0023032 A1 | | 1/2012 | Visdomini | |
| 2015/0254586 A1 | * | 9/2015 | Gorokhovsky | G06Q 10/063 705/7.23 |

(Continued)

OTHER PUBLICATIONS

Thomas, Douglas; "Costs, Benefits, and Adoption of Additive Manufacturing: A Supply Chain Perspective"; Jul. 2016. (Year: 2016).*

(Continued)

*Primary Examiner* — Resha Desai
*Assistant Examiner* — Dione N. Simpson
(74) *Attorney, Agent, or Firm* — Buckley, Maschoff & Talwalkar LLC

(57) ABSTRACT

Systems, methods, apparatus, computer program code and means are provided for bulk costing using an application server which receives a bulk costing request from a remote user device, the bulk costing request including a list of items to be costed and a set of input variables. A final list of components and assemblies is generated including a scenario for each item to be costed for each combination of input variables. A deep costing analysis is performed of the final list, resulting in an estimated cost for each of the items to be costed for each of the input variables.

15 Claims, 8 Drawing Sheets

(56) References Cited

U.S. PATENT DOCUMENTS

2016/0004792 A1    1/2016   Lester et al.
2019/0065629 A1    2/2019   Phinney et al.

OTHER PUBLICATIONS

Thomas, Douglas; "Costs, Benefits, and Adoption of Additive Manufacturing: A Supply Chain Perspective"; Int J Adv Manuf Technol. Jul. 2016. (Year: 2016).*

Mackay, Rod; "Estimate Your Part Manufacturing Cost with SOLIDWORKS & Free Online Training"; Javelin; Jun. 12, 2015. (Year: 2015).*

International Search Report and Written Opinion dated Jul. 28, 2020 which was issued in connection with PCT/US20/33773.

Indian First Examination Report dated Jun. 13, 2022 which was issued in connection with Indian Patent Application No. 202117053291.

\* cited by examiner

600

| | File | | | File Info | | | | | Production | | | |
|---|---|---|---|---|---|---|---|---|---|---|---|---|
| Status | File Name | Scenario | Directory | Img Path | Official? | Active? | Extract GCDs | Deep Cost | Input Rule | Comp. Type | Process Group | VPE | Material |
| | fastener.sldprt | demo_Brazil_1000_100 | c:\parts | | | y | y | | Update | Part | Sheet Metal | Brazil | Default |
| | bracket.sldprt | demo_Brazil_1000_100 | c:\parts | | | y | y | | Update | Part | Sheet Metal | Brazil | Default |
| | weld_support | demo_Brazil_1000_100 | c:\parts | | | y | y | | Update | Part | Sheet Metal | Brazil | Default |
| | sheetmtl_exer | demo_Brazil_1000_100 | c:\parts | | | y | y | | Update | Part | Sheet Metal | Brazil | Default |
| | assembly_exe | demo_Brazil_1000_100 | c:\parts | | | y | y | y | Update | Assembly | Assembly | Brazil | None |
| | fastener.sldprt | demo_Brazil_1000_200 | c:\parts | | | y | y | | Update | Part | Sheet Metal | Brazil | Default |
| | bracket.sldprt | demo_Brazil_1000_200 | c:\parts | | | y | y | | Update | Part | Sheet Metal | Brazil | Default |
| | weld_support | demo_Brazil_1000_200 | c:\parts | | | y | y | | Update | Part | Sheet Metal | Brazil | Default |
| | sheetmtl_exer | demo_Brazil_1000_200 | c:\parts | | | y | y | | Update | Part | Sheet Metal | Brazil | Default |
| | assembly_exe | demo_Brazil_1000_200 | c:\parts | | | y | y | y | Update | Assembly | Assembly | Brazil | None |
| | fastener.sldprt | demo_Brazil_1000_200 | c:\parts | | | y | y | | Update | Part | Sheet Metal | Brazil | Default |
| | bracket.sldprt | demo_USA_1000_100 | c:\parts | | | y | y | | Update | Part | Sheet Metal | USA | Default |
| | weld_support | demo_USA_1000_100 | c:\parts | | | y | y | | Update | Part | Sheet Metal | USA | Default |
| | sheetmtl_exer | demo_USA_1000_100 | c:\parts | | | y | y | | Update | Part | Sheet Metal | USA | Default |
| | assembly_exe | demo_USA_1000_100 | c:\parts | | | y | y | y | Update | Assembly | Assembly | USA | None |
| | fastener.sldprt | demo_USA_1000_100 | c:\parts | | | y | y | | Update | Part | Sheet Metal | USA | Default |
| | bracket.sldprt | demo_USA_1000_200 | c:\parts | | | y | y | | Update | Part | Sheet Metal | USA | Default |
| | weld_support | demo_USA_1000_200 | c:\parts | | | y | y | | Update | Part | Sheet Metal | USA | Default |

| | | Cost Object | | | Manufacturing Info | | | Variable Costs | | | | | |
|---|---|---|---|---|---|---|---|---|---|---|---|---|---|
| Status | Level | Name | Scenario | QTY | VPE | Process Group | Annual Volume | Batch Size | Material Cost | Labor | Direct OH | Batch Setup | Other Direct | Total |
| | 1 | assembly_exe | demo_Brazil_1000_100 | 1 | Brazil | Assembly | 1000 | 100 | 3.92 | 0.17 | 0.78 | 0.32 | 0.09 | 5.27 |
| | 2 | sheetmtl_exer | demo_Brazil_1000_100 | 1 | Brazil | Sheet Me | 1000 | 100 | 2.76 | 0.08 | 0.43 | 0.13 | 0.06 | 3.45 |
| | 2 | bracket | demo_Brazil_1000_100 | 1 | Brazil | Sheet Me | 1000 | 100 | 0.62 | 0.04 | 0.18 | 0.13 | 0.01 | 0.98 |
| | 2 | weld_support | demo_Brazil_1000_100 | 1 | Brazil | Sheet Me | 1000 | 100 | 0.53 | 0.02 | 0.13 | 0.03 | 0.01 | 0.72 |
| | 2 | fastener | demo_Brazil_1000_100 | 1 | Brazil | Sheet Me | 1000 | 100 | 0.01 | <0.01 | 0.03 | 0.43 | 0.01 | 0.07 |
| | 1 | assembly_exe | demo_Brazil_1000_200 | 1 | Brazil | Assembly | 1000 | 200 | 4.1 | 0.12 | 0.43 | 0.17 | 0.1 | 4.91 |
| | 2 | sheetmtl_exer | demo_Brazil_1000_200 | 1 | Brazil | Sheet Me | 1000 | 200 | 2.88 | 0.04 | 0.17 | 0.08 | 0.07 | 3.28 |
| | 2 | bracket | demo_Brazil_1000_200 | 1 | Brazil | Sheet Me | 1000 | 200 | 0.69 | 0.03 | 0.08 | 0.13 | 0.02 | 0.087 |
| | 2 | weld_support | demo_Brazil_1000_200 | 1 | Brazil | Sheet Me | 1000 | 200 | 0.53 | 0.02 | 0.13 | 0.03 | 0.01 | 0.7 |
| | 2 | fastener | demo_Brazil_1000_200 | 1 | Brazil | Sheet Me | 1000 | 200 | 0.01 | <0.01 | 0.03 | 0.78 | 0.01 | 4.91 |
| | 1 | assembly_exe | demo_Brazil_1000_200 | 1 | Brazil | Assembly | 1000 | 200 | 3.92 | 0.17 | 0.078 | 0.43 | 0.09 | 3.28 |
| | 2 | sheetmtl_exer | demo_USA_1000_100 | 1 | USA | Sheet Me | 1000 | 100 | 2.76 | 0.08 | 0.043 | 0.18 | 0.06 | 0.87 |
| | 2 | bracket | demo_USA_1000_100 | 1 | USA | Sheet Me | 1000 | 100 | 0.62 | 0.04 | 0.18 | 0.13 | 0.01 | 0.7 |
| | 2 | weld_support | demo_USA_1000_100 | 1 | USA | Sheet Me | 1000 | 100 | 0.53 | 0.02 | 0.13 | 0.03 | 0.01 | 0.04 |
| | 2 | fastener | demo_USA_1000_100 | 1 | USA | Sheet Me | 1000 | 100 | 0.01 | <0.01 | 0.03 | 0.33 | 0.01 | 5.27 |
| | 1 | assembly_exe | demo_USA_1000_100 | 1 | USA | Assembly | 1000 | 100 | 4.17 | 0.1 | 0.033 | 0.17 | 0.11 | 3.45 |
| | 2 | sheetmtl_exer | demo_USA_1000_200 | 1 | USA | Sheet Me | 1000 | 200 | 2.88 | 0.04 | 0.17 | 0.08 | 0.07 | 0.98 |
| | 2 | bracket | demo_USA_1000_200 | 1 | USA | Sheet Me | 1000 | 200 | 0.69 | 0.03 | 0.08 | 0.04 | 0.02 | 0.72 |

FIG. 7

SYSTEMS AND METHODS FOR BULK COMPONENT ANALYSIS

RELATED APPLICATIONS

This application is based on and claims benefit of and priority to U.S. Provisional Patent Application Ser. No. 62/850,083 filed May 20, 2019, the contents of which are hereby incorporated herein in their entirety for all purposes.

TECHNICAL FIELD

The present application generally relates to computer systems and more particularly to computer systems that are adapted to perform bulk component analysis.

BACKGROUND

Part of the process of designing and manufacturing a product is cost management. An enterprise that designs and manufactures a product needs to determine the cost of manufacturing the product or parts thereof (a process commonly referred to as "costing"). Often, complex scenarios need to be evaluated. For example, an enterprise may wish to evaluate costs of manufacture in different batch sizes, annual volumes and regions. Unfortunately, this causes a large number of permutations that need to be costed which increase the complexity and difficulty of costing.

SUMMARY OF THE INVENTION

According to some embodiments, systems, methods, apparatus, computer program code and means are provided for bulk costing using an application server which receives a bulk costing request from a remote user device, the bulk costing request including a list of items to be costed and a set of input variables. A final list of components and assemblies is generated including a scenario for each item to be costed for each combination of input variables. A deep costing analysis (in which the estimated cost of individual parts and components are generated) is performed of the final list, resulting in an estimated cost for each of the items to be costed for each of the input variables.

The present application is directed to systems and methods adapted to receive information associated with one or more parts or assemblies to be manufactured and automatically generate a list or matrix of different combinations of inputs and then perform costing of that list or matrix. Pursuant to some embodiments, large combinations of inputs can be costed efficiently allowing users to efficiently analyze different scenarios to identify the best manufacturing approach.

In some embodiments, a communication device associated with an application computer server exchanges information with remote devices that provide selected inputs and part or assembly information (including information from computer aided design or "CAD" software). The information may be exchanged, for example, via public and/or proprietary communication networks.

A technical effect of some embodiments of the invention is an improved and computerized way of generating costing matrixes or lists based on different inputs and then automatically determining an efficient costing approach by reordering the list to improve performance of the costing system. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 5-7 are views of graphical user interfaces according to some embodiments.

DETAILED DESCRIPTION

Figure 1:
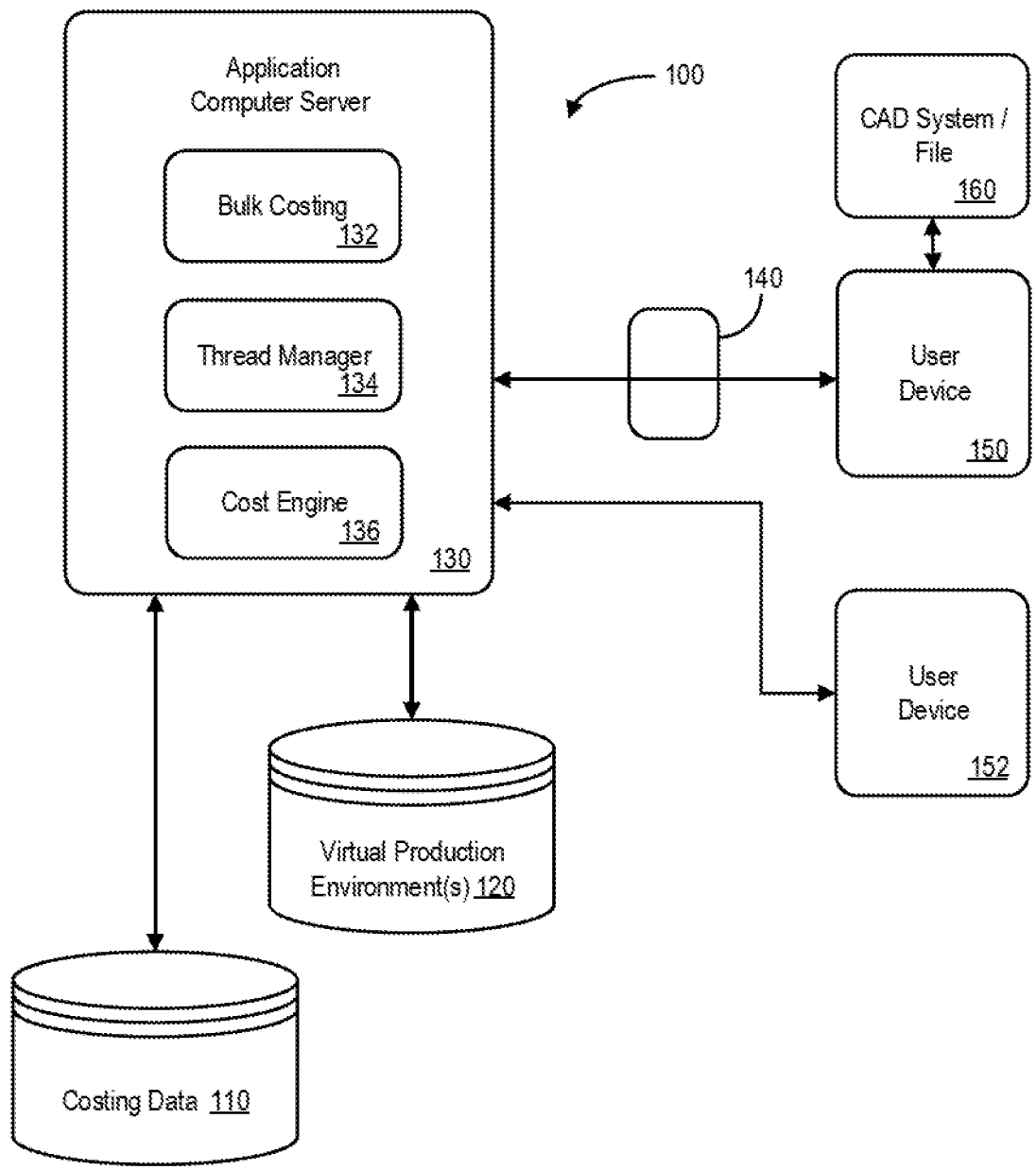
FIG. 1 is a high-level block diagram of a system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate bulk costing. The present invention is directed to more than merely a computer implementation of a routine or conventional activity previously known in the industry as it provides a specific advancement in the area of product manufacturing analysis by providing improvements in matrix costing to allow costing of large combinations of scenarios, including scenarios with different production environments, different production volumes and different batch sizes. The present invention provides technical solutions to ensure that the resulting large lists of parts to be costed are costed efficiently and with improved outcomes. The present invention provides improvement beyond a mere generic computer implementation as it involves the novel ordered combination of system elements and processes to provide improvements in bulk component analysis such as bulk costing of parts.

In addition, in the present invention bulk costing may be initiated or accessed, updated, and analyzed via an application server that improves the exchange of information, thus improving the overall efficiency of the system (e.g., by allowing the application server to perform bulk costing using processing threads designed to improve efficiency and reduce the time required to perform complex costing processes). In some embodiments, users operating user devices may interact with the application server using an application programming interface ("API").

In the context of the present application, the term "part" or "component" refers to an item or component to be manufactured. For example, a "part" may be a machined part, a sheet metal part, a cast part, or the like. Multiple parts may make up a "assembly". Pursuant to some embodiments, when submitted for costing pursuant to the present invention, a part or a component may be identified with information including: a name, manufacturing information such as a process group (such as "sheet metal", "cast" or "machined"), material information (including information identifying the type of material the part is fabricated from), one or more CAD files and other information that may assist in identifying and costing the part as described further herein.

In the context of the present application, "roll-up" refers to a collection of parts, assemblies or other roll-ups which is used to organize parts and assemblies into meaningful groupings for a user. As used herein, the term "virtual production environment" (or "VPE") is used to refer to a digital representation of a factory that includes algorithms, logic and rules for use in costing parts simulating the conditions of an actual production environment. For example, a user who wishes to analyze production costs in Brazil, China and the United States may interact with a Brazil VPE, a China VPE and a US VPE.

As used herein, the term "scenario" refers to a unique version of a part or assembly that is used to represent different manufacturing simulations. For example, a scenario may be created to cost a set of parts or assemblies with a Brazil VPE, a US VPE and a China VPE with different volume and batch size assumptions. In some embodiments, a scenario naming convention may be used to allow each scenario to be descriptively named. As an illustrative example, a scenario costing a part in Brazil with an annual production volume of 1000 units and a batch size of 100 units may be named "[part-name]_Brazil_1000_100_[date]" or the like.

Features of some embodiments allow complex scenarios to easily be costed. As an illustrative example, a user wishes to operate a system configured pursuant to the present invention to evaluate a bid package containing a group of parts and assemblies that would be sent to a supplier for final quotation. The user wishes to perform costing to estimate what the bid package would cost in two different regions, at two different annual volumes, and with three batch sizes. In prior systems, the user would have to create twelve different roll-ups (two times two times three) to capture each unique combination of inputs for each of the components (and children of the assemblies). Each of these roll-ups would be costed separately in a manual process. Such prior processes were time consuming, required substantial manual effort and led to inconsistencies and inaccuracies. Pursuant to some embodiments, a bulk costing system substantially eliminates any manual intervention and provides cost outputs quickly and accurately.

Embodiments provide substantial benefits for a number of different use cases. For example, embodiments may be used to create bid packages for quotation, to match supplier quoted quantities, to determine a least expensive region from which to source a part, and to optimize batch costs. Further, embodiments provide data usable for planning cost versus capacity and to determine break points for suppliers bidding on business.

Features of some embodiments will now be described by reference to FIG. 1. FIG. 1 is a high-level block diagram of a system 100 according to some embodiments of the present invention. In particular, the system 100 includes an application server 130 that executes one or more applications including a bulk costing application 132, a thread manager 134 and a cost engine 136 which will be described further herein. The application server 130 interacts with one or more data storage devices which store, for example, costing data 110 and data associated with one or more virtual production environments 120. The application server 130 may also exchange information with one or more user devices such as user device 152 and user device 150 (e.g., via an API 140). The application server 130 may interact with user devices 150, 152 in a number of ways (in addition to the bulk costing requests described herein). For example, application server 130 and user devices 150, 152 may generally interact to submit, receive, request and otherwise transmit costing data and costing request data. Further, the devices may support other interactions such as, for example, interactions to provide cost information to user devices 150, 152 to allow the devices to design manufacturing experiments or optimizations such that designs may be optimized with cost as a factor. In such embodiments, the application server 130 may interact with the devices 150, 152 to modify CAD models based on costing and other analyses done on a part or a component such as, for example, stress or fluid flow experiments.

As another illustrative example, application server 130 may interact with user devices 150, 152 to transmit cost data back to product lifecycle management ("PLM") systems or enterprise resource planning ("ERP") systems in the form of attributes or reports that get attached to objects stored in those systems. As another illustrative example, application server 130 may interact with user devices 150, 152 to retrieve or pull attribute data from PLM, ERP or other systems to drive costing inputs (e.g., to influence, change or modify VPE models, manufacturing routings or other manufacturing assumptions). As another example, the application server 130 may retrieve known cost data from PLM or ERP systems to do part by part comparisons in order to tune VPE accuracy. Each of these interactions may be performed using the API 140 or other interfaces.

According to some embodiments, an interactive graphical user interface platform of the server 130 (and, in some cases, third-party data) may facilitate interactions between user devices and the server 130. For example, a user device 150 may transmit a bulk costing request and associated information to the server 130. In some embodiments, the bulk costing request may include information from a CAD system or CAD file 160 as well as input information used by the server 130 to generate a number of costing scenarios as will be described further herein. The CAD system or CAD file 160 may also be an input file provided by another system, such as a PLM system. In general, any source of component specifications may be used.

In some embodiments, interaction between a user device such as the user device 150 and server 130 is via an API 140. Pursuant to some embodiments, the API 140 may allow bulk costing requests to be initiated from user devices 150 operating software configured to interact with the API 140 such as, for example, a client application designed to work specifically with the server 130 as well as other client applications (such as a spreadsheet application, a Web application or the like).

In some embodiments, user devices such as the user device 152 may communicate directly with the application server 130. For example, the user device 152 may operate client software that allows a user to interact with the application server 130 (e.g., via an Internet connection). Note that the application server 130 and/or any of the other devices and methods described herein might be associated with a third party, such as a vendor that performs a service for an enterprise.

The application server 130 and/or the other elements of the system 100 might be, for example, associated with a Personal Computer ("PC"), laptop computer, smartphone, an enterprise server, a server farm, and/or a database or similar storage devices. According to some embodiments, an "automated" application server 130 (and/or other elements of the system 100) may facilitate generation of bulk costing results as described herein. As used herein, the term "automated" may refer to, for example, actions that can be performed with little (or no) intervention by a human.

As used herein, devices, including those associated with the application server 130 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The application server 130 may store information into and/or retrieve information from the costing data store 110 and/or the VPE data store 120 in order to perform costing as described further herein. Although not shown in FIG. 1, the application server 130 may also receive and write data to and from one or more CAD files or systems and/or one or more PLM files or systems. For example, CAD files may be received in conjunction with a list submitted for processing from a user device 150, 152. The application server 130 may access those files during processing as described further herein. The data stores 110, 120 may be locally stored or reside remote from the application server 130 Although a single application server 130 is shown in FIG. 1, any number of such devices may be included. Moreover, various devices described herein might be combined according to embodiments of the present invention.

Figure 2:
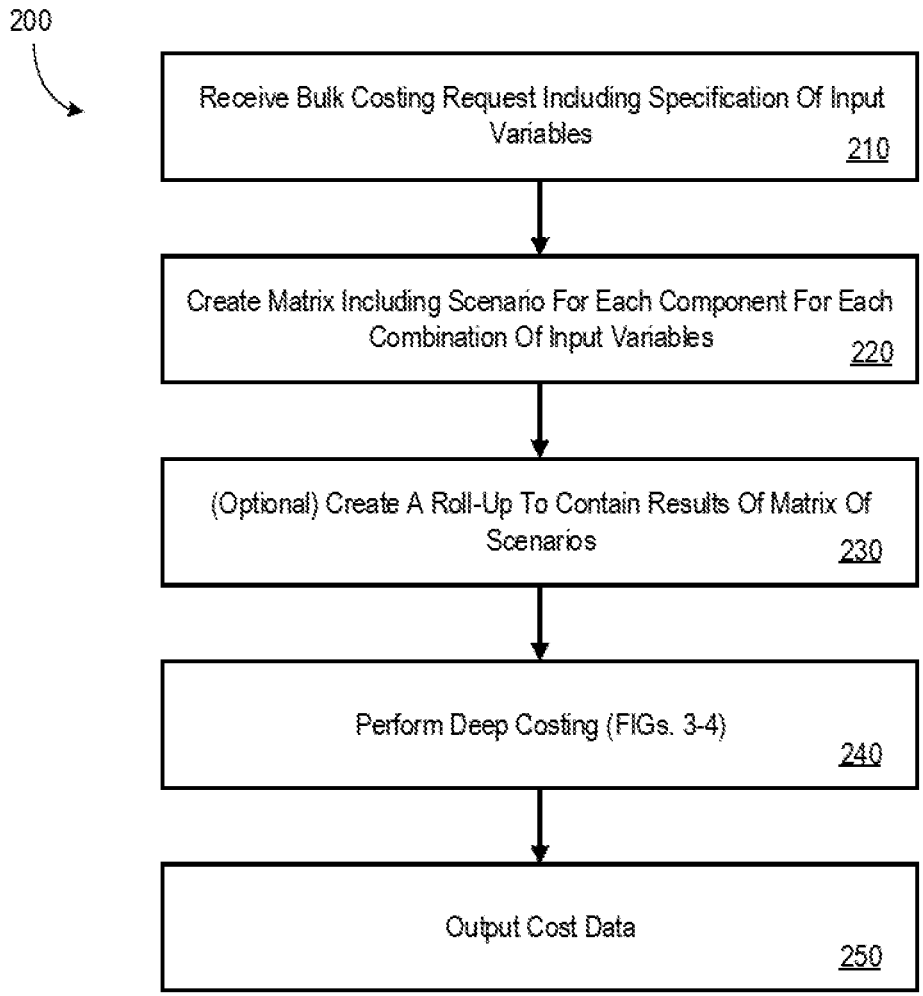
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The method 200 may be performed upon receipt of a bulk costing request from a user device 150, 152. The bulk costing request received at 210 may include information specifying one or more input variables as well as information identifying one or more parts or components to be costed. The request received at 210 may be received via an API 140 or via another form of communication (e.g., such as via a file upload to application server 130 or the like). For the purposes of explanation, an example will now be introduced and described throughout the remainder if this disclosure to illustrate features of some embodiments. In the illustrative example, a user operating a user device 150 has identified a number of parts or components to be costed. The parts each have one or more CAD models associated with them. The parts form one or more assemblies. The user wishes to have the parts costed using several different VPE's (Brazil, China, India and the US) and with two different annual volumes (1000 and 5000) and in two different batch sizes (100 and 500). This will result in sixteen different costing scenarios—an unwieldy number of scenarios using prior systems and methods. Pursuant to embodiments of the present invention, the user need only initiate a bulk costing request 210 submitting the information identifying the parts and assemblies as well as the input variables (the identification of the VPE's, the volumes and the batch sizes), and the application server 130 will handle the processing.

While several input variables are described herein (VPEs, volumes and batch sizes), a number of other input variables may also be used. For example, inputs such as material type, number of cavities, stock form, etc. may be used to specify the types of variables that should be used to create a matrix for deep costing. As will be described further herein, even if a large number of variables are specified (resulting in a very large matrix of part combinations to be costed), embodiments allow efficient and automated costing of those combinations.

Processing continues at 220 where the bulk costing module 132 of the application server 130 process the information received in the request message and creates a matrix including scenarios for each component for each combination of input variables. The resulting matrix may be stored in a memory associated with the server 130 in the form of a list of items. For example, in the illustrative example, each item in the list of items may include information including: a part file (e.g., from a CAD system), a scenario name (e.g., such as in a descriptive format such as "[request-name]_[VPE]_[Volume]_[Batch]_date" or "demo_Brazil_1000_100_5-1-2020"), file information (e.g., such as information specifying a path to the file or to an image file, attributes of the file, a flag indicating any processing rules to be followed, a component type, a process group, the VPE, and information identifying the part's material). Other information associated with the part and it's handling may also be provided.

Figure 8:
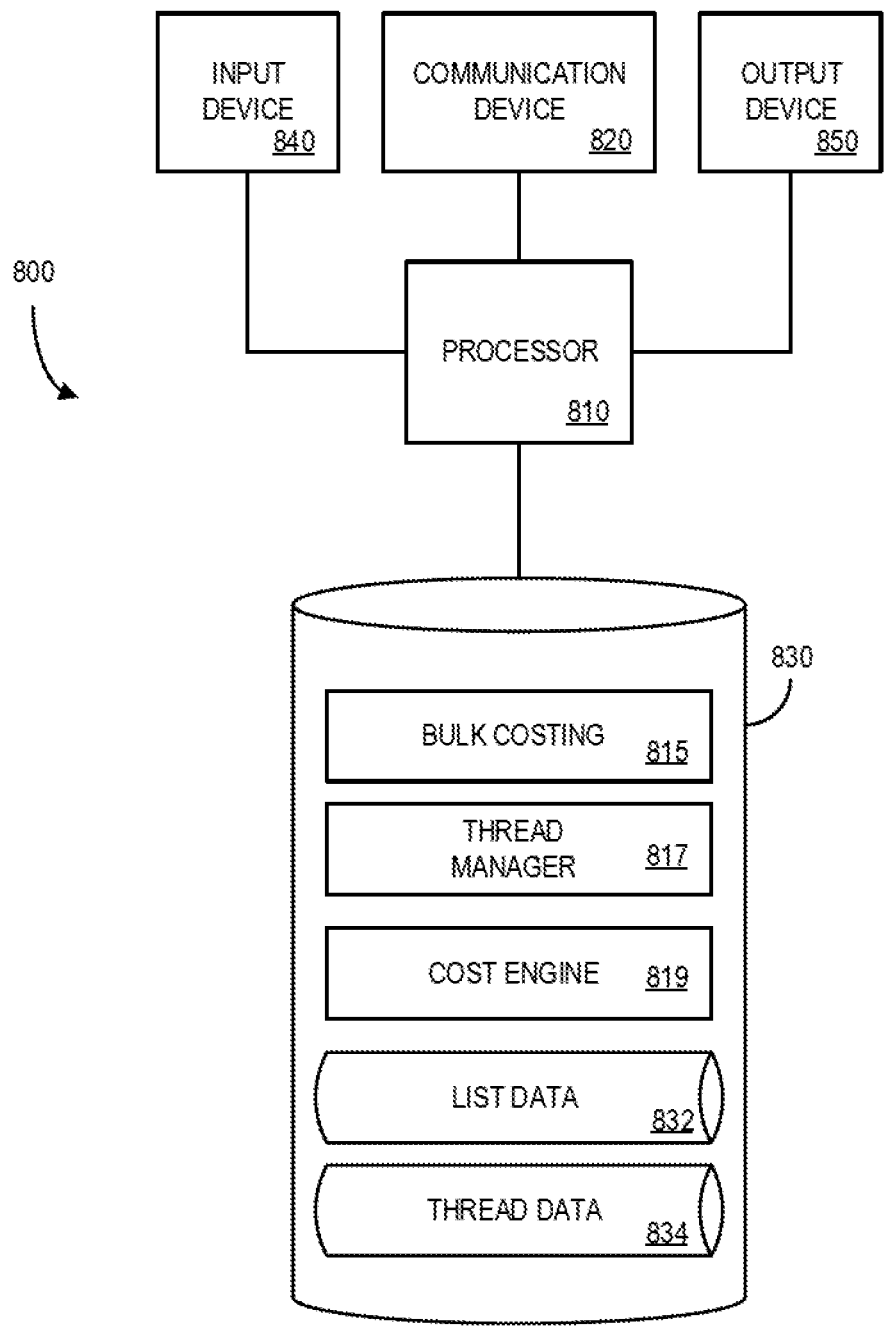
FIG. 8 is a block diagram of an apparatus in accordance with some embodiments of the present invention.

Processing may optionally continue at 230 where one or more roll-ups may be created to contain results of the matrix. For example, roll-ups may be created for each VPE or the like. Processing continues at 240 where the list is provided to the cost engine 136 to perform deep costing as will be described further below in conjunction with FIGS. 3-4. Once the deep costing has been performed and the results returned to the bulk costing module 132, the results may be output at 250. In some embodiments, the results may be output as a display in a user interface as shown in FIG. 8 below. In some embodiments, the results may be provided in a format such as a JSON object or the like and provided to a user device 150, 152 for further processing. Further, in some embodiments, the output data may be provided to a reporting or analytics system, allowing users operating user devices 150, 152 to report on and analyze the data to select a manufacturing approach that best suits their needs.

Pursuant to some embodiments, the process 200 of FIG. 2 may be performed frequently and on request from a number of different user devices 150, 152. As will be described further below, embodiments allow multiple costing operations to be performed in parallel to increase performance and throughput.

Figure 3:
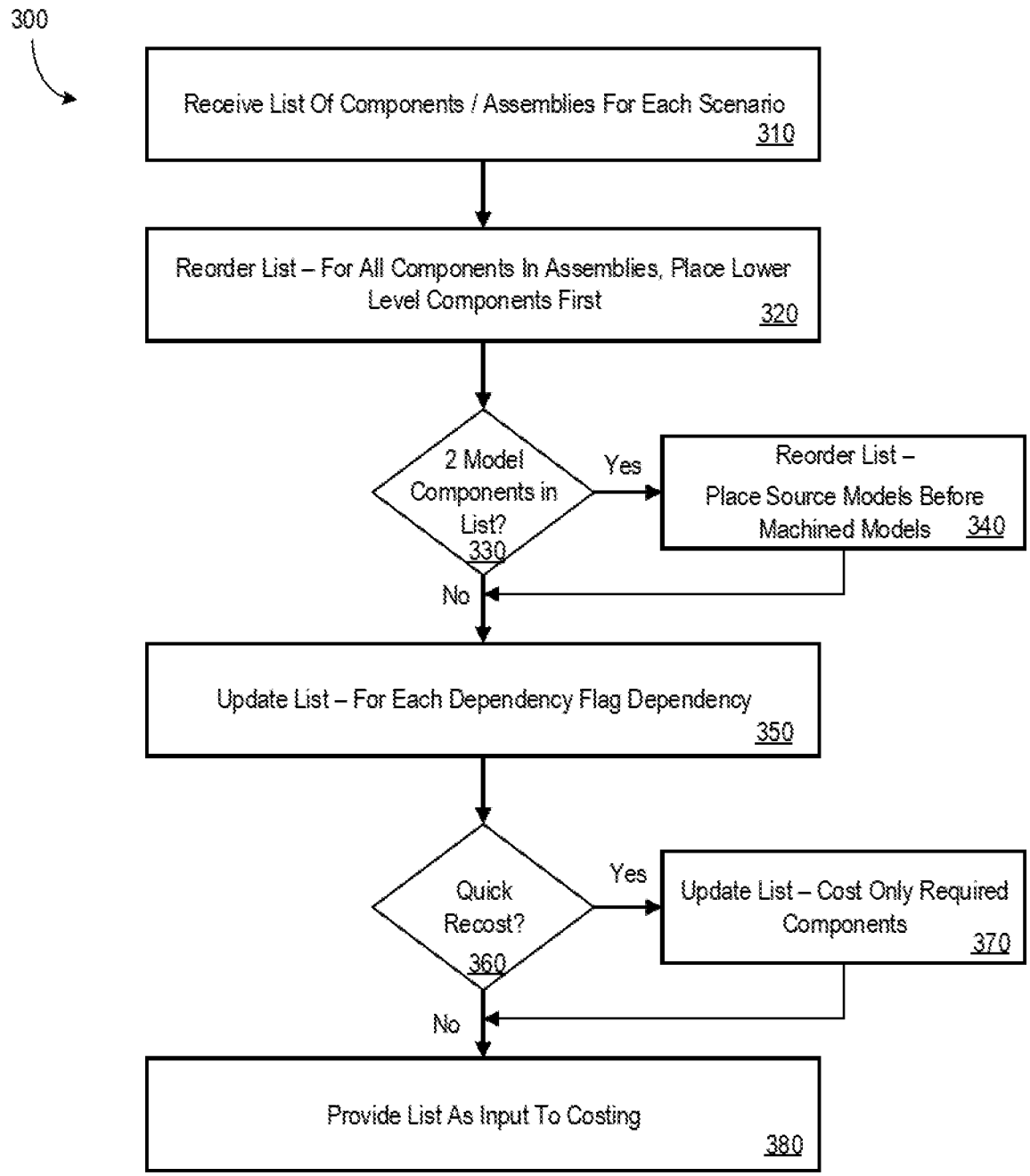
FIG. 3 illustrates a method according to some embodiments of the present invention.
Figure 4:
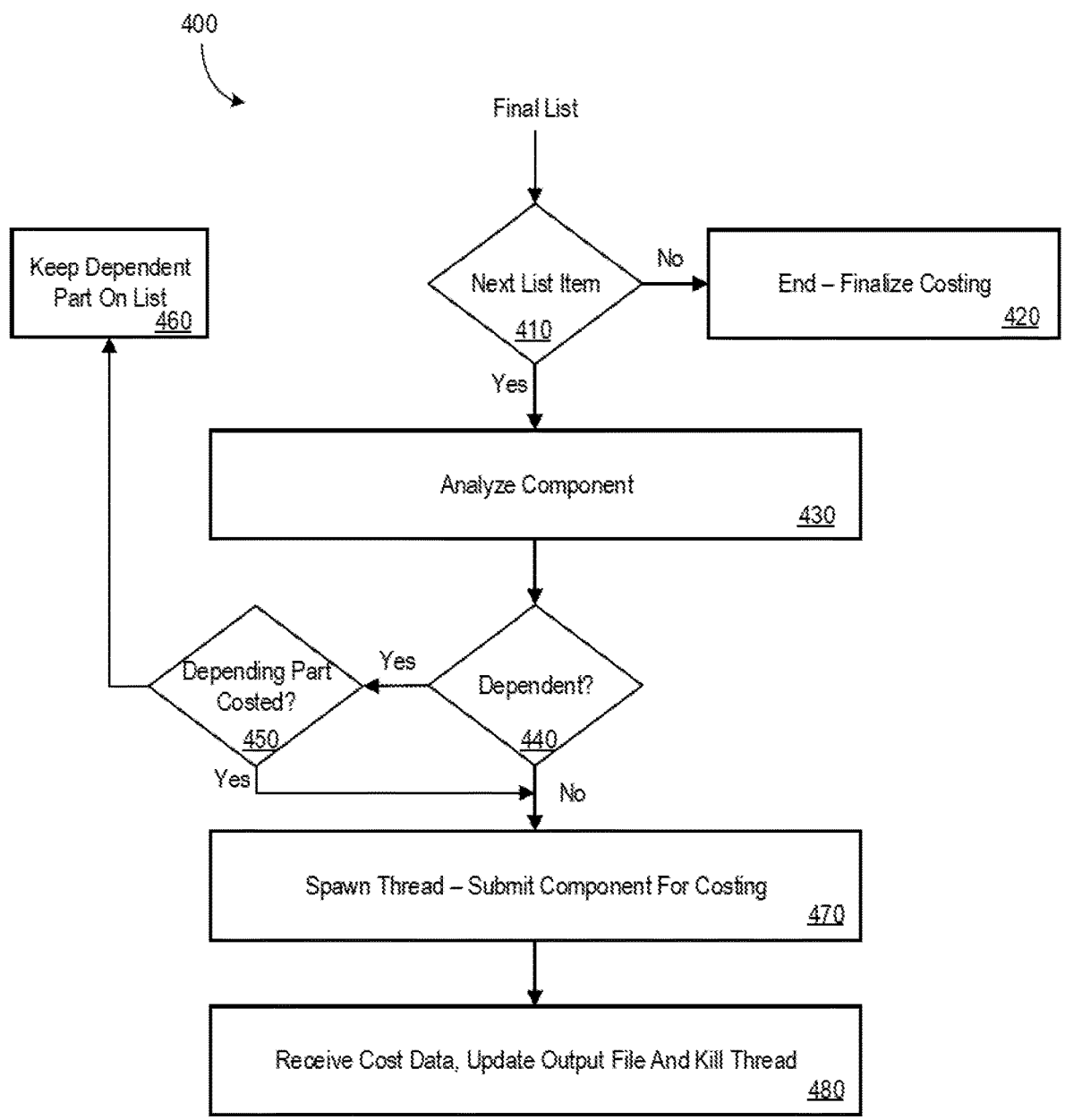
FIG. 4 illustrates a method according to some embodiments of the present invention.

Referring now to FIG. 3, a process 300 is shown which may be performed by the cost engine 136 upon receipt of an initial list of components and assemblies to be costed at 310. Processing continues at 320 where the cost engine 136 operates to reorder the list by analyzing each component that is in an assembly to place lower level components first. For example, if an assembly includes a bracket and a fastener to attach the bracket to another component, the bracket is a lower level component than the fastener. Processing at 320 iterates through the entire list until a reordered list has been produced with each lower level component in an assembly placed lower than the other components in the assembly.

Processing continues at 330 where the reordered list is evaluated to determine if any of the components in the list are two model components (or components with two CAD models—a source model and a machined model). If so, processing continues at 340 where the list is again reordered to place the source models before the machined models for those components with both models.

Processing continues at 350 where the cost engine 136 operates on the further reordered list to identify any components that are dependent on other components. In some embodiments, the list is updated with a flag for such dependencies. The dependency flags will be used during costing at, for example, step 440 of FIG. 4.

Processing continues at 360 where an optional processing step to determine if a quick recost process should be performed. A quick recost may be performed on parts or scenarios which were previously costed. In some embodiments, the quick recost only re-evaluates certain files and parts that are indicated as being required from a previous costing event. Processing at 360 may include analyzing the CAD models associated with each part or item on the list as well as a previously used analysis. If the CAD model has changed, a quick recost is not viable and a full recost for that part or component will be performed. If the previously used analysis is not available with the currently selected inputs (e.g., the selected VPEs, the volumes and the batch sizes) then the quick recost is not available and processing continues at 380. If a quick recost is available, processing continues at 370 and the list is updated to flag only the required components to be costed. Pursuant to some embodiments, in a quick recost of the present invention, certain items are evaluated (such as, for example, process and operation feasibility files, machine selection files, material stock selection files, cost taxonomy files, or the like) while other items are skipped (such as, for example, geometry extraction, evaluation across multiple routings, evaluation across multiple operation options, and evaluation across multiple material stock options). For example, in a quick recost costing, in the case of material stocks, the set of candidate stocks from the stock selection logic is obtained. If a stock is found that matches the one used in the previous costing, the other candidates are discarded and only that one stock is costed. In general, pursuant to some embodiments, a quick recost may be any simplified or minimized costing that reduces the amount of costing effort required based on information from a previous costing.

In some embodiments, the determination of whether a quick recost process should be performed may be implemented during later processing. For example, the quick recost process may be performed at the time that parts are being costed (such as in the process 400 described in conjunction with FIG. 4). For example, the quick recost determination may be performed during thread processing of process 400—those parts that need a recost will be recosted, while those that do not will be skipped.

Once the list has been updated to identify the required items to be costed, processing continues at 380 and the resulting list is provided as the final list as input to the cost engine. In some embodiments, processing continues with the process 400 of FIG. 4.

Process 400 begins with receipt of the final list and the list is iteratively processed at 410 to select the next item on the list (until no items remain and the process ends at 420). The next list item or component is analyzed at 430 to determine if the component is a dependent component (e.g., as flagged at step 350 of FIG. 3). If so, processing continues at 450 where a determination is made whether the depending part has been costed. If it has, processing continues at 470 and a thread is created or spawned and a process is initiated in that thread to cost the component. If the depending part has not been costed, processing continues at 460 where the dependent component is placed back on the list to await further processing at 410 (i.e., to await processing until the depending component has been costed). In some embodiments, when the depending component has been costed, the dependent component is slotted into the next available thread. The use of threads allows costing operations to be spread across resources (such as CPUs configured for costing analysis). In this manner, many components can be costed at the same time rather than requiring that they be costed in series. The result is a much quicker operation with fewer blocking errors.

Processing continues at 480 when the thread is killed once the cost data is received and an output file is updated with the cost data. The process 400 continues until all components in the final list have been costed. Because the list was ordered using the logic described herein, the performance and accuracy of the costing is maximized.

Figure 5:
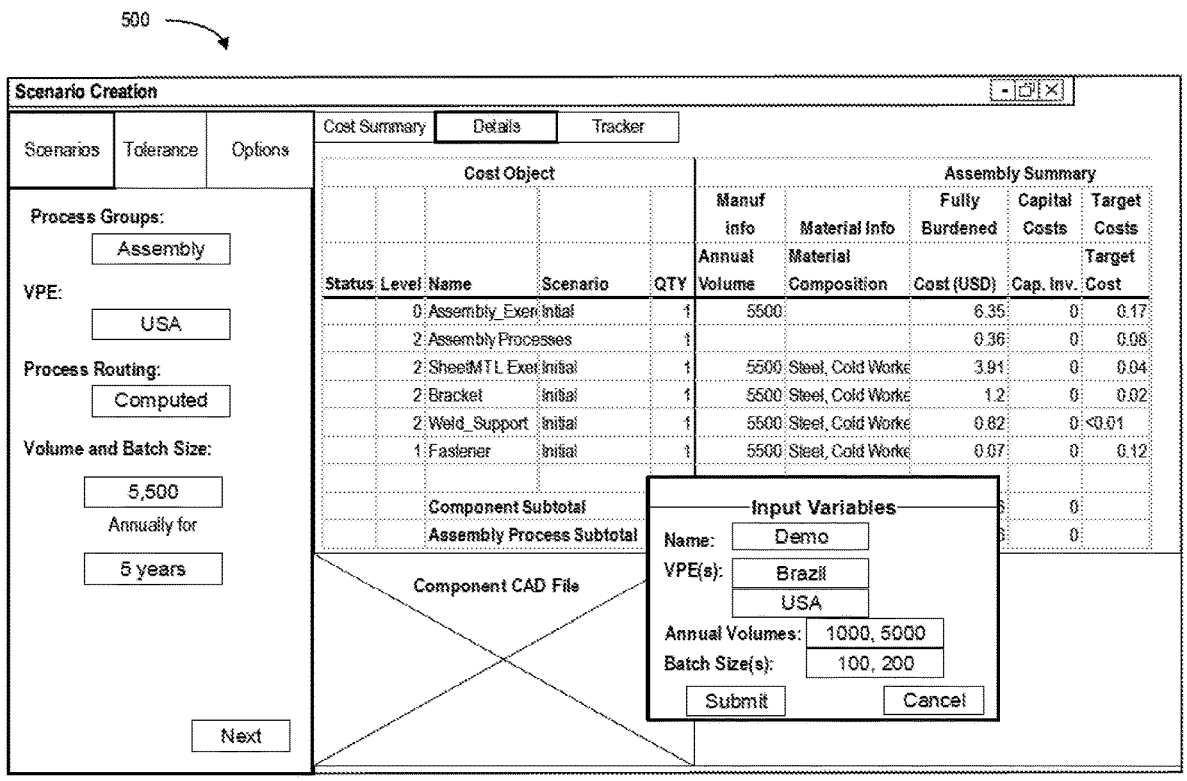

Reference is now made to FIGS. 5-7 where graphical user interfaces pursuant to some embodiments are shown. For example, FIG. 5 shows a user interface 500 which may be presented to a user operating a user device 150, 152 before a bulk costing request has been submitted to the application server 100. The user may interact with a modal window to specify one or more input values for the bulk costing request which will be submitted with the part and component information in the file. Once submitted to the application server 100, the bulk costing of the present invention begins.

FIG. 6 shows a user interface 600 which may be presented to a user operating a user device 150, 152 showing the user the matrix generated by the bulk costing module 132 (prior to costing). The user interface 600 shows all of the scenarios that were created based on the inputs and all of the inputs are shown as set properly. To submit the matrix for further processing, the user may simply select the "cost" button. The user may also interact with the matrix to modify any settings before costing.

FIG. 7 shows a user interface 700 which may be presented to a user operating a user device 150, 152 after costing. The user interface 700 shows the user all the costed matrix options and the user can view the cost information in a roll-up. The user can interact with the interface 700 to initiate a number of actions, such as, for example, to create a bid package for quotation, to determine where to source a part from, etc.

The embodiments described herein may be implemented using any number of different hardware configurations. For example, FIG. 8 illustrates an application server or apparatus 800 that may be, for example, associated with the system 100 described with respect to FIG. 1. The apparatus 800 comprises a processor 810, such as one or more commercially available central processing units ("CPUs") in the form of one- or multi-chip microprocessors, coupled to a communication device 820 configured to communicate via a communication network (not shown in FIG. 8). The communication device 820 may be used to communicate, for example, with one or more remote user computers and or communication devices (e.g., PCs or smartphones). Note that communications exchanged via the communication device 820 may utilize security features, such as those between a public internet user and an internal network of an insurance company and/or an enterprise. The security features might be associated with, for example, web servers, firewalls, and/or PCI infrastructure. The apparatus 800 further includes an input device 840 (e.g., a mouse and/or keyboard to enter information about parts or components, etc.) and an output device 850 (e.g., to output reports such as, for example, bulk costing results, etc.).

The processor 810 also communicates with a storage device 830. The storage device 830 may comprise any appropriate information storage device, including combinations of magnetic storage devices (e.g., a hard disk drive), optical storage devices, and/or semiconductor memory devices. The storage device 830 stores program code including, for example, a bulk costing program 815, a thread manager program 817 and a cost engine 819 which are configured to control the processor 810. The processor 810 performs instructions of the programs 815-819, and thereby operates in accordance with any of the embodiments described herein. For example, the processor 810 may receive a bulk costing request and perform operations to create a list for bulk costing. The processor 810 may then execute thread manager 817 and cost engine 819 code to cause the list to be bulk costed using one or more threads.

The programs 815-819 may be stored in a compressed, uncompiled and/or encrypted format. The programs 815-819 may furthermore include other program elements, such as an operating system, a database management system, and/or device drivers used by the processor 810 to interface with peripheral devices.

The functions of application server 100 or server 800 described herein may be implemented using computer applications comprising computer program code stored in a non-transitory computer-readable medium that is executed by a computer processor. The functions of application server 100 or server 800 described herein may also be implemented in programmable hardware devices such as field programmable gate arrays, programmable array logic, programmable logic devices or the like. Further, functions described herein may be implemented using some combination of computer program(s) executed by a computer processor and programmable hardware devices. Thus, servers of the present application comprise suitable computer hardware and software for performing the desired functions and are not limited to any specific combination of hardware and software.

The executable computer program code may comprise one or more physical or logical blocks of computer instructions, which may be organized as an object, procedure, process or function. For example, the executable computer program code may be distributed over several different code partitions or segments, among different programs, and across several devices. Accordingly, the executable computer program need not be physically located together but may comprise separate instructions stored in different locations which, when joined logically together, comprise the computer application and achieve the stated purpose for the computer application.

As used herein, information may be "received" by or "transmitted" to, for example: (i) the application server 800 from another device; or (ii) a software application or module within the application server 800 from another software application, module, or any other source.

In some embodiments (such as shown in FIG. 8), the storage device 830 further stores information such as, for example, list data 832 and thread data 834 which are used by the programs 815-819 to perform processing as described herein.

Thus, embodiments may provide an automated and efficient way to perform bulk costing of parts and components including costing of a matrix of parts and components with a variety of different inputs and scenarios. Embodiments allow such costing to be performed quickly and accurately in part, by performing list management functions during processing that allow parts or components to be efficiently costed.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be delivered in other modes, such as via a file or spreadsheet and/or the databases described herein may be combined or stored in external systems). Moreover, although embodiments have been described with respect to particular types of components or parts, embodiments may instead be associated with costing or analyzing other manufacturing processes. Similarly, although certain attributes were described in connection some embodiments herein, other types of attributes might be used instead. Still further, the displays and devices illustrated herein are only provided as examples, and embodiments may be associated with any other types of user interfaces.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A bulk costing system implemented via an application computer server, comprising:
   (a) a costing data store containing electronic records that represent a plurality of cost data elements that provide a production cost estimate for a plurality of components;
   (b) a virtual production environments data store containing electronic records that represent a plurality of simulated production environments (VPEs);
   (c) a communication port coupled to the application computer server to facilitate a transmission of data with remote user devices via an API (application programming interface) and a distributed communication network; and
   (d) the application computer server, coupled to the costing and VPE data store, programmed to:
   receive, via the API and the communication port, a bulk costing request from a remote user device, the bulk costing request including at least one CAD (computer aided design) file and a list of items to be costed and a set of input variables;

generate, by a bulk costing engine, a final list of components and assemblies including a scenario for each item to be costed for each combination of input variables, the generating of the final list including the bulk costing engine to:
  generate an initial list of components and assemblies for each scenario for each item to be costed for each combination of input variables;
  reorder the initial list to create a first reordered list to optimize the initial list for processing to create the final list;
  analyze at least one of the initial list and the first reordered list to identify any components that are two model components based on the at least one CAD file, wherein the two model components comprise at least one source model and at least one machine model; and
  reorder the first reordered list to create a second reordered list in which, for each two model component, the at least one source model is placed higher in the second reordered list than the at least one machined model;
perform, by a cost engine, a deep costing analysis of the final list by:
  iteratively selecting a next item in the final list;
  initiating a new processing thread in which the next item is costed using one of a plurality of processors; and
  computing cost data associated with the next item and terminating the processing thread, the deep costing analysis of the final list resulting in an estimated cost for each of the items for each of the input variables;
modifying the at least one CAD file based on the deep costing analysis; and
transmit, via the API and the communication port, the estimated cost for each of the items for each of the input variables to the remote user device to select a manufacturing approach to manufacture each of the items based on the estimated cost.

2. The system of claim 1, wherein the set of input variables includes one or more of a VPE, a production volume, a production batch size, a material, a number of cavities, and a stock form.

3. The system of claim 1, wherein the application computer server is further programmed to:
  create, by the bulk costing engine, at least a first roll-up to contain results of costing one or more of the scenarios.

4. The system of claim 1, wherein the reordering of the initial list further comprises operating the bulk costing engine to:
  analyze the initial list to identify components in assemblies and to identify lower level components in each assembly; and
  reorder the initial list to create the first reordered list in which the lower level components in each assembly are placed higher in the first reordered list than higher level components for the assembly.

5. The system of claim 1, wherein the reordering of the initial list further comprises operating the bulk costing engine to:
  modify at least one of the initial list, the first reordered list and the second reordered list to flag each component that is dependent on another component to create an updated list.

6. The system of claim 5, wherein the reordering of the initial list further comprises operating the bulk costing engine to:
  determine that a quick recost is to be performed; and
  modify the updated list to create a final list that only include items required for the quick recost.

7. The system of claim 5, wherein the reordering of the initial list further comprises operating the bulk costing engine to:
  create the final list from the updated list.

8. The system of claim 1, wherein the deep costing analysis further comprises operating the cost engine to:
  confirm that the next item is not dependent on another item that has not been costed.

9. The system of claim 1, wherein the deep costing analysis further comprises operating the cost engine to:
  create an output file containing estimated cost data for each of the items in the final list.

10. The system of claim 9, wherein the estimated cost data is provided as an input to a reporting system.

11. A computerized bulk costing method implemented via a computer server, comprising:
  receiving a bulk costing request from a remote user device an API (application programming interface), the bulk costing request including at least one CAD (computer aided design) file and a list of items to be costed and a set of input variables;
  generating, by a bulk costing engine, a final list of components and assemblies including a scenario for each item to be costed for each combination of input variables, the final list generated by:
    generating an initial list of components and assemblies for each scenario for each item to be costed for each combination of input variables;
    analyzing the initial list to identify components in assemblies and to identify lower level components in each assembly; and
    reordering the initial list to create a first reordered list in which the lower level components in each assembly are placed higher in the first reordered list than higher level components for the assembly, the reordering of the initial list includes:
      analyzing at least one of the initial list and the first reordered list to identify any components that are two model components based on the at least one CAD file, wherein the two model components comprise at least one source model and at least one machine model;
      reordering the first reordered list to create a second reordered list in which, for each two model component, the at least one source model is placed higher in the second reordered list than the at least one machined model;
  performing, by a cost engine, a deep costing analysis of the final list, resulting in an estimated cost for each of the items for each of the input variables;
  modifying the at least one CAD file based on the deep costing analysis; and
  transmitting, via the API, the estimated cost for each of the items for each of the input variables to the remote user device to select a manufacturing approach to manufacture each of the items based on the estimated cost.

12. The method of claim 11, wherein the reordering of the initial list further comprises:

modifying at least one of the initial list, the first reordered list and the second reordered list to flag each component that is dependent on another component to create an updated list.

13. The method of claim 12, wherein the reordering of the initial list further comprises:
    determining that a quick recost is to be performed; and
    modifying the updated list to create a final list that only include items required for the quick recost.

14. The method of claim 12, wherein the reordering of the initial list further comprises:
    creating the final list from the updated list.

15. A non-transitory, computer-readable medium storing instructions, that, when executed by a processor, cause the processor to perform a bulk costing method, the method comprising:
    receiving, via an API (application programming interface), a bulk costing request from a remote user device, the bulk costing request including at least one CAD (computer aided design) file and a list of items to be costed and a set of input variables;
    generating, by a bulk costing engine, a final list of components and assemblies including a scenario for each item to be costed for each combination of input variables, the final list generated by:
        generating an initial list of components and assemblies for each scenario for each item to be costed for each combination of input variables;
        analyzing the initial list to identify components in assemblies and to identify lower level components in each assembly;
        reordering the initial list to create a first reordered list in which the lower level components in each assembly are placed higher in the first reordered list than higher level components for the assembly, the reordering of the initial list includes:
            analyzing at least one of the initial list and the first reordered list to identify any components that are two model components based on the at least one CAD file, wherein the two model components comprise at least one source model and at least one machine model; and
            reordering the first reordered list to create a second reordered list in which, for each two model component, the at least one source model is placed higher in the second reordered list than the at least one machined model;
    performing, by a cost engine, a deep costing analysis of the final list, resulting in an estimated cost for each of the items for each of the input variables;
    modifying the at least one CAD file based on the deep costing analysis; and
    transmitting, via the API, the estimated cost for each of the items for each of the input variables to the remote user device select a manufacturing approach to manufacture each of the items based on the estimated cost.

* * * * *